United States Patent [19]

Hayden

[11] Patent Number: 5,080,433
[45] Date of Patent: Jan. 14, 1992

[54] APPARATUS AND METHOD OF A VEHICLE SEAT WITH AN ADJUSTABLE LEG REST

[75] Inventor: Richard A. Hayden, Troy, Mich.

[73] Assignee: General Motors Corporation, Detroit, Mich.

[21] Appl. No.: 651,683

[22] Filed: Feb. 6, 1991

[51] Int. Cl.⁵ .............................................. A47C 7/02
[52] U.S. Cl. ................................. 297/284 H; 297/434
[58] Field of Search ................ 297/429, 284 H, 312, 297/431, 434

[56] References Cited

U.S. PATENT DOCUMENTS

| | | | |
|---|---|---|---|
| 642,010 | 1/1900 | Seng. | |
| 670,869 | 3/1901 | Clement. | |
| 2,520,309 | 8/1950 | Everest et al. | 155/171 |
| 2,530,924 | 11/1950 | Turner | 155/116 |
| 2,662,585 | 12/1953 | Ozenne | 155/162 |
| 2,901,026 | 8/1959 | Thaden | 155/116 |
| 4,018,477 | 4/1977 | Hogan | 297/284 |
| 4,324,431 | 4/1982 | Murphy et al. | 297/284 |
| 4,334,709 | 6/1982 | Akiyama et al. | 297/284 |
| 4,775,185 | 10/1988 | Scholin et al. | 297/312 |

FOREIGN PATENT DOCUMENTS 2562003 10/1988 France.

Primary Examiner—Kenneth J. Dorner
Assistant Examiner—Cassandra L. Hope
Attorney, Agent, or Firm—Ernest E. Helms

[57] ABSTRACT

The present invention provides an apparatus and method of utilization of for the same of a vehicle car seat with a leg rest. The apparatus of the present invention provides an infinitely variable leg rest whose inclination is determined by the location of a sliding lock mechanism on a rod projecting underneath the leg rest.

2 Claims, 2 Drawing Sheets

APPARATUS AND METHOD OF A VEHICLE SEAT WITH AN ADJUSTABLE LEG REST

FIELD OF THE INVENTION

The field of the present invention is that of vehicle seats. More particularly, the field of the present invention is that of vehicle seat with adjustable thigh or leg rest.

DISCLOSURE STATEMENT

To aid in vehicle occupant comfort it is known in the past to add an adjustable thigh or leg rest. Prior leg rests have been incremental in nature to allow the occupant to select the position of maximum comfort. It is desirable that the leg rest be infinitely variable in its adjustment.

SUMMARY OF INVENTION

To meet the desired need of a vehicle seat with an infinitely variable leg rest the present invention is brought forth. The present invention provides a leg rest which is pivotably connected to the femur member of the seat. A rod is pivotably connected to the femur member of the seat underneath the leg rest. The leg rest has connected with it a pivotal link which by selective frictional engagement may be affixed to the rod along various locations, thereby allowing infinitely variable adjustment of the inclination of the leg rest with respect to the femur member of the seat.

It is an object of the present invention to provide a vehicle seat with an infinitely variable leg rest. It is another object of the present invention to provide a method of infinitely variably adjusting the inclination of a leg rest of a vehicle seat.

It is an object of the present invention to provide a vehicle seat with an infinitely adjustable leg rest, said seat in combination comprising: a femur support; a leg rest pivotably connected with said femur support; a rod pivotably connected with said femur support projecting generally underneath said leg rest and having an extension near its end adjacent its pivotable connection with said femur support; a first biasing spring connected with said rod extension for biasing said leg rest angularly downward; an angled link pivotably connected with said leg rest having a bore on its lower end through which said rod is projecting; and a second spring for selectively biasing said link into frictional engagement with said rod along a plurality of positions upon said rod whereby the inclination of said leg rest is adjusted.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
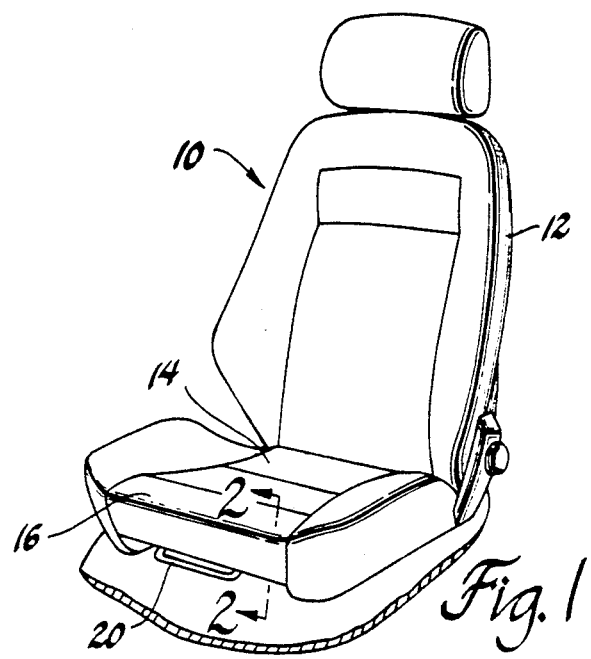
FIG. 1 is a perspective view of an embodiment of the vehicle seat of the present invention.
Figure 2:
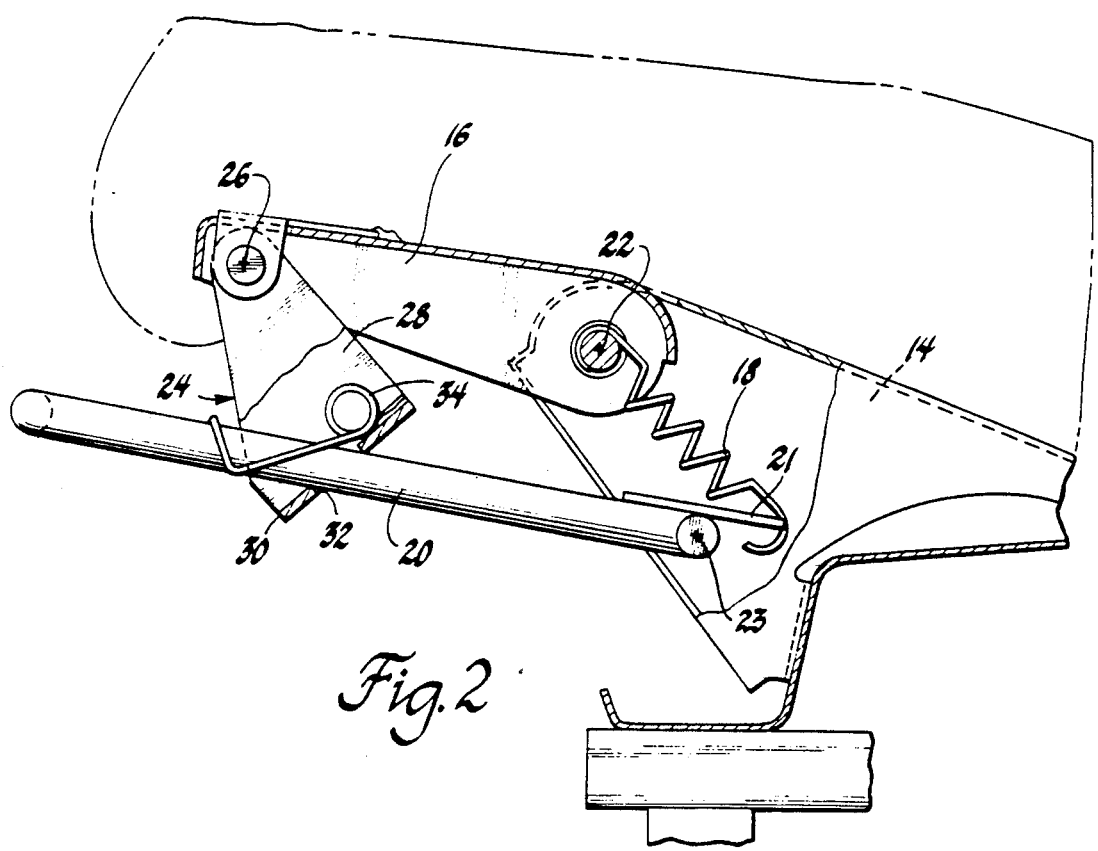
FIG. 2 is an enlarged side view of the vehicle seat illustrated in FIG. 1 in a first position.

Referring to FIGS. 1 and 2 the vehicle seat 10 of the present invention has a seat back 12 and a femur support 14. Pivotally and non-slidably connected at fixed axis 22 and projecting forwardly from the femur support 14 is a leg rest 16.

The leg rest 16 inclination with respect to the femur support 14 is infinitely variable between a predetermined angular range.

A first spring 18 is provided to angularly bias the leg rest 16 downward. One end of the spring is connected at point 22 and the other end of the spring is attached to an extension 21 of a rod 20.

Pivotally connected along fixed axis 23 with the femur support 14 is the rod 20. If desired the rod 20 may be U-shaped projecting on both sides of the seat for added support. The rod projects underneath the leg rest 16 and is usually partially concealed by the padding of the leg rest.

Pivotally connected to leg rest 16 on an axis 26 fixed with respect to the leg rest 16 is a sliding lock mechanism 24. The sliding lock mechanism 24 includes an angle shaped link 28 having a lower member 30 with a bore 32. To provide means to selectively affix the link 28 with the rod 20, the rod 20 is fitted through the bore 32. A second spring 34 attempts to make the lower member 30 coplanar with the rod 20 thereby causing the link 28 to engage with the rod 20 frictionally affixing the link 28 with the rod 20.

Figure 3:
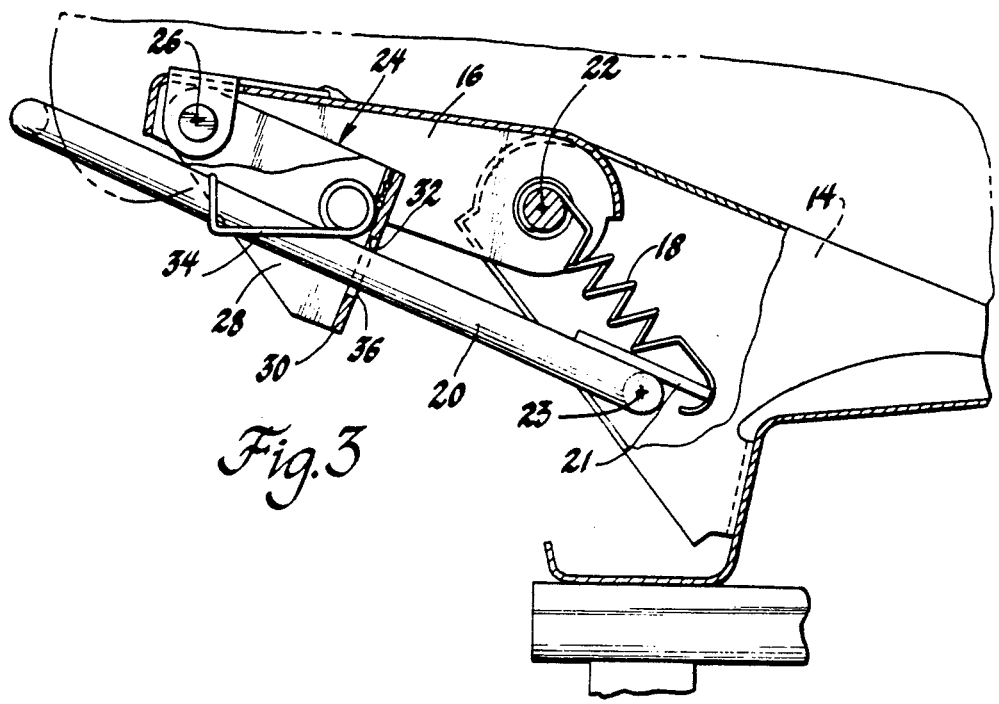
FIG. 3 is a side view of the vehicle seat illustrated in FIG. 2, showing the operation of adjustment.
Figure 4:
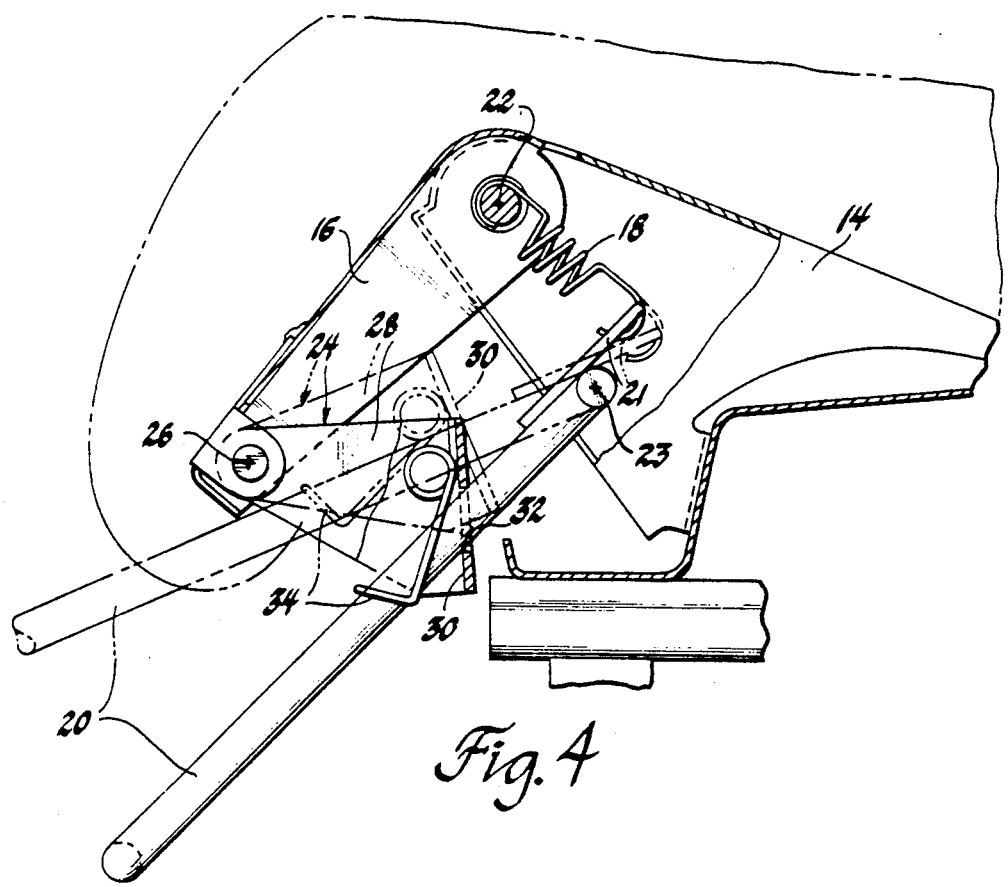
FIG. 4 is a side view of the vehicle seat illustrated in FIG. 2 being adjusted to a position of greater inclination.

To adjust the leg rest 16 from the position illustrated in FIG. 2 to the position shown in FIG. 4 the rod 20 is pulled upwards (FIG. 3). The upward pull of rod overcomes the force of the second spring 34 and bore 32 will now have a clearance 36 with the rod 20. The leg rest 16 may now be infinitely adjusted to a plurality of angles of inclination between a predetermined angular range. When the leg rest 16 is moved to the position shown in FIG. 4 the rod 20 will be released from the position shown in phantom. Second spring 34 will urge the rod 20 to a position engaging with bore 32. Link 28 is now affixed at a different position with respect to the rod 20 and the inclination of leg rest 16 is now reset.

As previously mentioned the rod 20 also has along the rod's end adjacent to axis 23 an extension 21. Extension 21 is separated from the position of engagement of the link 28 on the rod 21 by axis 23. Extension 21 provides a bracket for holding the first spring 18. Spring 18 angularly biases rod extension 21 upwards to bias link 28 and the leg rest 16 in a downward direction. The orientation of the extension 21 may be chosen so that the biasing force urging the leg rest 16 downward may be varied depending upon the angular orientation of the leg rest 16.

The present invention provides a method of infinitely adjusting the inclination of a leg rest 16 from the femur support 14 of a vehicle seat 10 including the following steps:

1. Pivotably connecting a leg rest 16 from a femur support 14;

2. Pivotably connecting to said femur support 14 a rod 20 underneath said leg rest 16;

3. Pivotably connecting with said leg rest 16 a link 28;

4. Selectively frictionally engaging said link 28 with said rod 20 to fix the position of said link 28 with said rod 20 to adjust the inclination of said leg rest 16.

While an embodiment of the present invention has been explained it will be readily apparent to those skilled in the art of the various modifications which can be made to the present invention without departing from the spirit and scope of this application as it is encompassed by the following claims.

The embodiments of the invention in which an exclusive property or privilige is claimed are defined as follows:

1. A vehicle seat with an adjustable leg rest infinitely variable between a predetermined angular range, said seat in combination comprising:

a femur support;

a leg rest pivotally and non-slidably connected with said femur support along a fixed pivotal axis and said leg rest being spring biased angularly downward;

a rod pivotally connected with said femur support along a fixed pivotal axis projecting generally underneath said leg rest;

a link pivotally connected with said leg rest along a pivotal axis fixed with respect to said leg rest, said link having a bore surrounding said rod and being selectively spring biased to frictionally engage said rod along a plurality of positions upon said rod whereby the inclination of said leg rest is adjusted; and an extension on said rod separated from the position of engagement of said link on said rod by the pivotal axis of said rod with said femur support, said extension being connected with a first spring, said first spring angularly biasing said rod extension upward whereby said link and said leg rest are biased in a downward direction.

2. A vehicle seat with an adjustable leg rest infinitely variable between a predetermined angular range, said seat in combination comprising:

a femur support;

a leg rest pivotally and non-slidably connected with said femur support along a fixed pivotal axis;

a rod pivotally connected with said femur support along a fixed pivotal axis projecting generally underneath said leg rest, and having an extension near its end adjacent its pivotable connection with said femur support;

an angled link pivotally connected with said leg rest having a bore on its lower end through which said rod is projecting;

a first biasing spring connected with said rod extension for biasing said rod extension angularly upwards thereby biasing said link and said leg support angularly downward; and a second spring for selectively biasing said link into frictional engagement with said rod along a plurality of positions upon said rod whereby the inclination of said leg rest is adjusted.

* * * * *